United States Patent [19]
Hanson et al.

[11] Patent Number: 5,394,464
[45] Date of Patent: Feb. 28, 1995

[54] PROGRESSIVE AUTOMATIC ACTIVATION AND AUTOMATIC RESETTING OF CALL COVERAGE

[75] Inventors: Thomas C. Hanson, Boulder; Richard P. Moleres, Lewisville, both of Colo.

[73] Assignee: AT&T Corp., Murray Hill, N.J.

[21] Appl. No.: 204,029

[22] Filed: Mar. 1, 1994

[51] Int. Cl.⁶ .......................................... H04M 3/42
[52] U.S. Cl. ................... 379/201; 379/211; 379/214; 379/266; 379/220; 379/228
[58] Field of Search ............ 379/211, 214, 266, 220, 379/221, 223, 228, 201

[56] References Cited

U.S. PATENT DOCUMENTS

| | | | |
|---|---|---|---|
| 4,436,962 | 3/1984 | Davis et al. | 179/18 |
| 4,436,963 | 3/1984 | Cottrell et al. | 179/18 B |
| 4,682,354 | 7/1987 | Vanacore | 379/211 |
| 4,873,717 | 10/1989 | Davidson et al. | 379/211 |
| 5,027,384 | 6/1991 | Morganstein | 379/67 |

Primary Examiner—James L. Dwyer
Assistant Examiner—Michael Lan
Attorney, Agent, or Firm—David Volejnicek

[57] ABSTRACT

An automatically progressively-activated and reset "send-all-calls" (SAC) feature provides the following functionality. In response to receipt at a switching system of each call for a destination subscriber station that has the feature enabled, the system retrieves a stored specified period of time for which a call directed to the station is allowed to go unanswered at the station, and then shortens the stored specified period, thereby progressively hastening activation of SAC for a subsequent call. If the retrieved period is of nonzero duration, the switching system directs the received call to the destination station. If the retrieved period is of zero duration, or if the directed received call goes unanswered at the destination station for the duration of the retrieved period, the switching system redirects the call to a call-coverage facility in the manner of a standard SAC feature. In response to the detection, at any time, of switchhook activity at the destination station, the switching system lengthens the stored specified period to a predetermined maximum length, thereby automatically resetting the progressive SAC feature.

29 Claims, 2 Drawing Sheets

PROGRESSIVE AUTOMATIC ACTIVATION AND AUTOMATIC RESETTING OF CALL COVERAGE

TECHNICAL FIELD

This invention relates generally to telecommunications, and specifically to telecommunications call-coverage arrangements.

BACKGROUND OF THE INVENTION

Call coverage arrangements provide redirection of an incoming call from an intended destination facility (e.g., a subscriber station) to an alternate facility where the call can be answered. One typical call coverage feature is the "send-all-calls" (SAC) feature. The SAC feature is normally activated for a subscriber station in response to a code dialed from the subscriber station or, if the subscriber station includes a SAC feature button, in response to pressing of the feature button. Following the activation of the SAC feature, all further calls destined for that station are diverted and redirected to an alternate call-answering facility. Subsequently, in response to either another code dialed from the subscriber station or a second pressing of the SAC feature button, the SAC feature is deactivated and calls destined for that station are once again directed to that station.

U.S. Pat. No. 4,682,354 discloses an improvement to the basic SAC feature that provides for the automatic activation of the feature. A failure to answer a call at a destination station for a predetermined number of rings results in redirection of the unanswered call and automatic activation of the SAC feature for all subsequent calls that are destined for this station, by the switching system that serves the destination station. Deactivation of the feature is accomplished manually, as before.

SUMMARY OF THE INVENTION

We have realized that abrupt activation of call coverage—whether manual or automatic—and the requirement for manual deactivation thereof are not advantageous. Accordingly, our invention provides for a progressive, or graduated, activation of call-coverage. That is, automatic invocation of call coverage (such as is provided by the SAC feature, for example) for a station is delayed for an evershortening interval for each call destined for that station during which interval the call goes unanswered. The invention also provides for automatic resetting, or deactivation, of the call coverage for the destination station in response to predetermined activity at the station, such as a call being answered or generated at the station (referred to as "switch-hook activity" in telephony parlance). That is, the delay interval is reset to its maximum length in response to detection of the predetermined activity.

The progressive automatic activation of call coverage has the advantage that it automatically increases the speed with which a call is redirected to an alternative call-answering facility in proportion to the increasing likelihood that the call will not be answered at the destination station, yet still provides for an opportunity to answer the call at the destination station. The intended recipient of a call is thus not deprived of the opportunity to answer the call just because he or she happened to miss answering one previous call. The intended recipient may therefore screen incoming calls and answer only selected ones. Also, the automatic resetting of call coverage automatically reflects detection of an increased likelihood that a future call will be answered at the destination station. This frees the intended recipient of the call of having to remember to deactivate the call-coverage feature, and of the necessity of doing so manually. In other words, the invention intelligently and automatically adapts activation and deactivation of call coverage to changing conditions, thereby providing the intended call recipient with improved service.

Specifically according to the invention, there is provided a call-coverage method or apparatus that functions in the following manner. In response to a call directed to a destination facility going unanswered at the destination facility for a first period of time, the call is automatically redirected to an alternative facility, and also a second period of time, shorter than the first period, is automatically set as the period of time for which a next call directed to the destination facility will be allowed to go unanswered at the destination facility before being automatically redirected to the alternative facility. Preferably, the period of time is shortened for each subsequent unanswered call, until an incoming call is sent directly to coverage. But in response to switch-hook activity at the destination facility, such as a call being originated or answered at the destination facility, the period of time is automatically set to a maximum predetermined period of time for which a next call directed to the destination facility will be allowed to go unanswered at the destination facility before being automatically redirected to the alternative facility. The call that is answered at the destination facility could illustratively be either the first-mentioned call, or the second-mentioned call, or yet another call. The term "call" is used expansively herein to mean any telecommunication and not just a conventional telephone call.

Generally according to the invention, there is provided a call-control method or apparatus wherein, in response to each individual call of a sequence of a plurality of calls, an amount of time that is allowed to pass before detection of a first predetermined condition results in a first predetermined action being taken with respect to a corresponding next call in the sequence is monotonically changed (i.e., only increased in each instance or only decreased in each instance) relative to an amount of time corresponding to the individual call that is allowed to pass before detection of the first predetermined condition results in the first predetermined action being taken with respect to the individual call. But in response to detection of a second predetermined condition, the amount of time that is allowed to pass before detection of the first predetermined condition results in a first predetermined action being taken with respect to the next call is automatically set to a predetermined amount of time. Preferably, the amount of time is allowed to automatically monotonically change only within a predetermined range, and the predetermined amount of time is the one of the upper limit and the lower limit of the range that the amount of time is changing away from. As evidenced by this characterization of the invention, the invention has broad applicability to the field of call-control beyond call-coverage.

These and other advantages and features of the invention will become more apparent from the following description of an illustrative embodiment of the invention taken together with the drawing.

DETAILED DESCRIPTION

Figure 1:
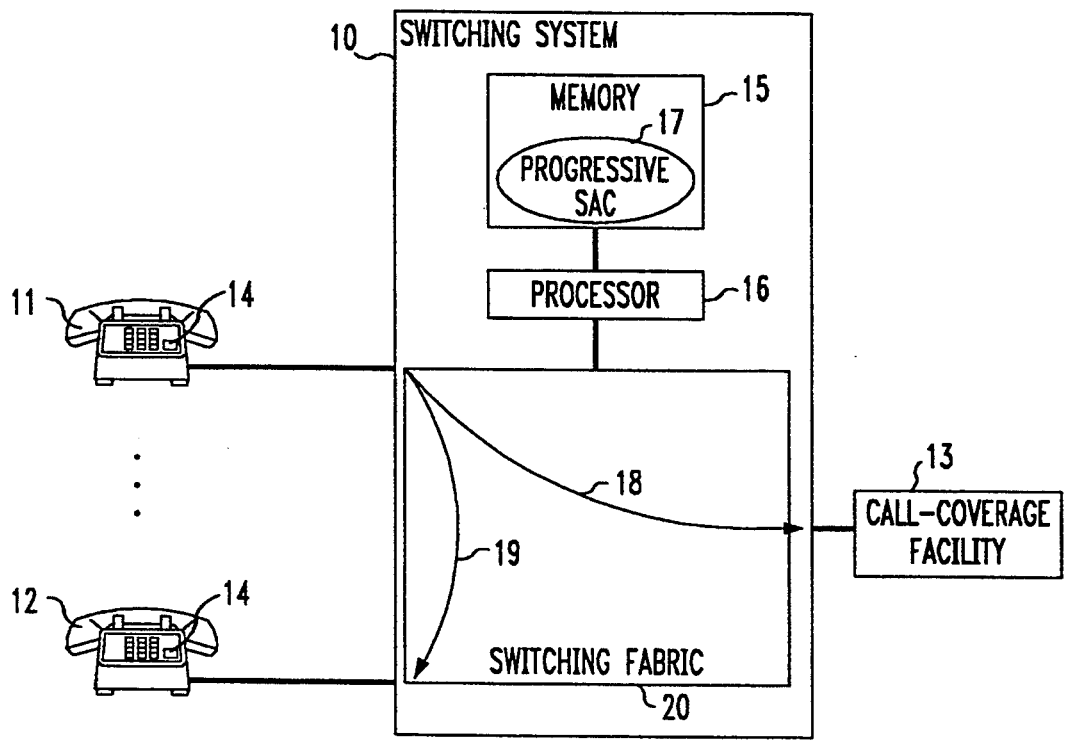
FIG. 1 is a block diagram of an illustrative telephone system that incorporates an illustrative embodiment of the invention.

FIG. 1 shows in block form an illustrative telephone system that incorporates an illustrative embodiment of the invention. The telephone system includes a switching system 10 that serves a plurality of subscriber stations 11-12. Associated with switching system 10 is a call-coverage facility 13 that provides call-coverage for stations 11-12. Facility 13 may be an operator or other attendant station, an adjunct processor such as a voice messaging system, or just another subscriber station like stations 11-12. Illustratively, switching system 10 is an AT&T Definity ® private branch exchange (PBX), stations 11-12 are AT&T 7444 telephones, and facility 13 is an AT&T Audix ® voice-messaging system.

Switching system 10 provides the conventional SAC feature. For manual activation and deactivation of this feature, each station 11-12 includes a SAC button 14. According to the invention, system 10 also provides a progressive SAC feature 17, which is administratively individually enabled or disabled for each station 11-12. As is conventional, system 10 is a stored-program-controlled system that includes a memory 15 for storing control programs, a control processor 16 that executes the stored programs, and a switching fabric 17 that selectively makes and breaks call connections under control of processor 16. Like other, conventional, features, progressive SAC feature 17 is implemented in this illustrative embodiment as a program stored in memory 15 and executed by processor 16. Progressive SAC feature 17 is represented in flow diagram form in FIGS. 2 and 3.

Figure 2:
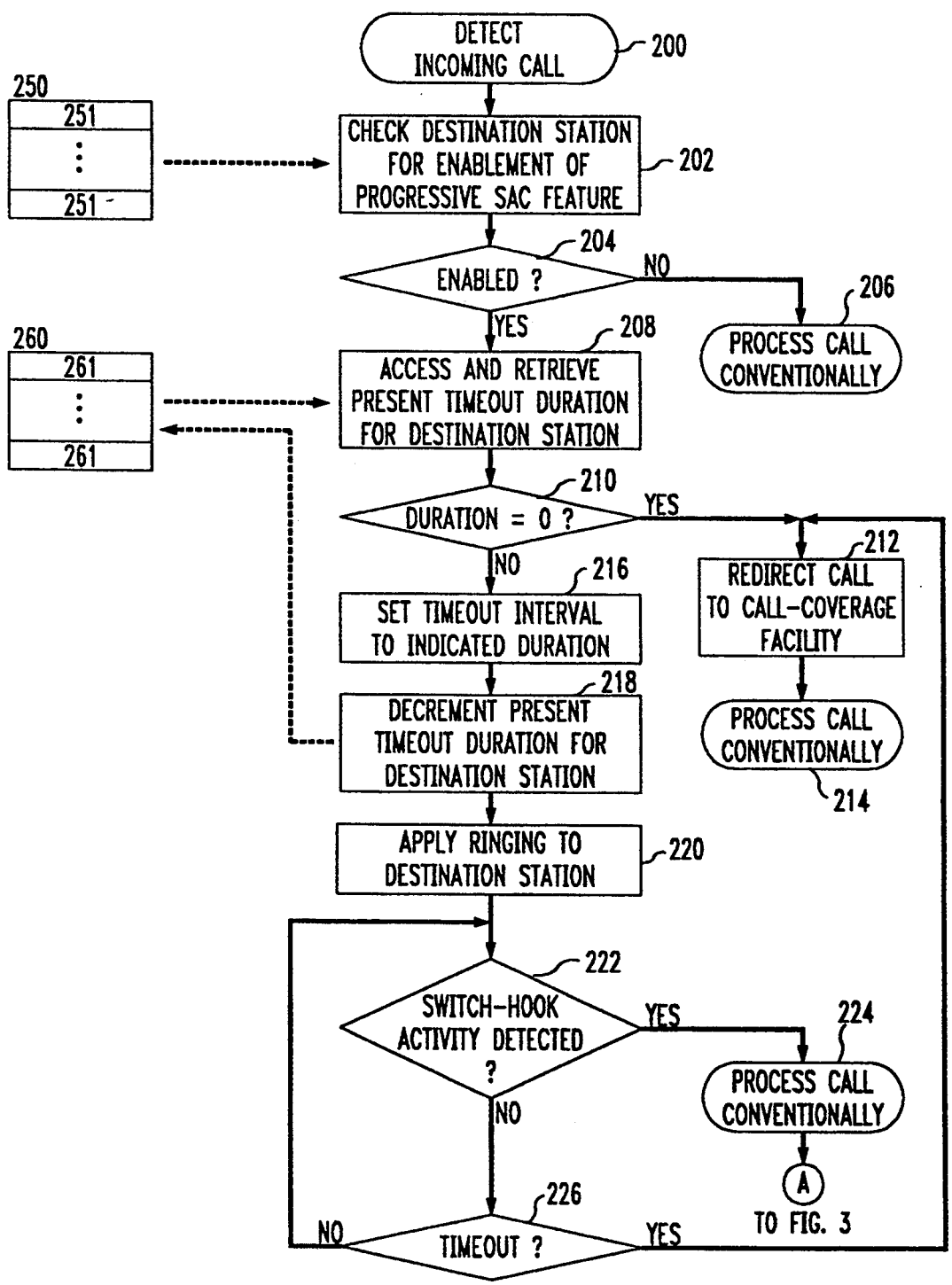
FIG. 2 is a flow diagram of the automatic progressive call-coverage activation function of the telephone system of FIG. 1.

FIG. 2 shows the automatic activation function of progressive SAC feature 17. Execution of this function is invoked, at step 200, upon detection by processor 16 of an incoming call. Let's assume that a call from a calling station 11 and destined for a called station 12 has been detected by processor 16. In response, processor 16 checks an entry 251 for destination station 12 in a translations table 250 to determine whether the graduated SAC feature has been enabled for this destination station, at step 202. This information will have been administratively entered into table 250 for each station 11-12. If the feature has not been enabled, as determined at step 204, processor 16 exits the activation function and processes the call conventionally, at step 206. If the feature has been enabled, as determined at step 204, processor 16 accesses an entry 261 for destination station 12 in a progressive SAC timeout interval duration table 260 to retrieve therefrom the present timeout interval duration indication, at step 208. Illustratively, table 260 will have been initially administratively populated with a system-wide maximum timeout interval duration value. Preferably, table 260 comprises a plurality of resettable counters 261, and the present count of each counter 261 indicates the number of rings for which a call is allowed to go unanswered before being redirected to call-coverage facility 13. Having retrieved the present timeout interval duration indication for destination station 12, at step 208, processor 16 checks whether that interval duration is zero, at step 210. If so, processor 16 redirects the call to call-coverage facility 13, as indicated at step 212, by causing switching fabric 17 of FIG. 1 to establish a connection 18. The call is then handled conventionally, as indicated at step 214.

Figure 3:
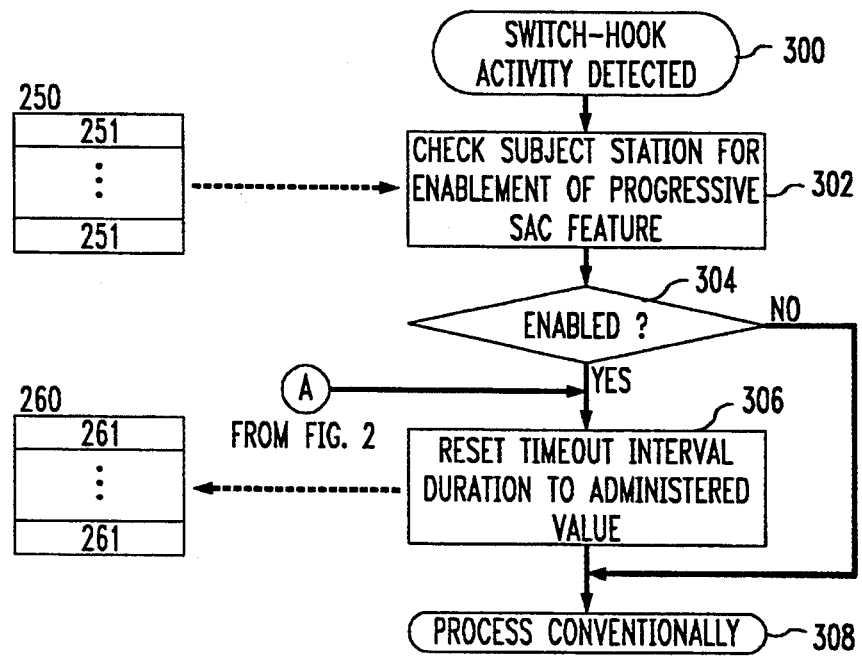
FIG. 3 is a flow diagram of the automatic progressive call-coverage reset function of the telephone system of FIG. 1.

Returning to step 210, if the timeout interval duration is there found to not be zero, processor 16 sets timeout interval for station 12 to the indicated duration, at step 216, and then decrements by a predetermined amount (e.g., one ring) the duration that is indicated by entry 261 for destination station 12, at step 218. Processor 16 then conventionally causes ringing to be applied to destination station 12, at step 220. Processor 16 then checks destination station 12 for switch-hook activity, at step 222. The checked activity includes normal switch-hook activity, such as station 12 going off-hook to answer or originate a call, as well as other activity that indicates the presence of a person at station 12 and hence a likelihood that a call will be answered at station 12. If switch-hook activity is detected at step 222, processor 16 invokes conventional processing for the call, at step 224. This includes causing switching fabric 17 to establish connection 18 or 19, as appropriate for the detected switch-hook activity. Processor 16 also executes steps 306 et seq. of the reset function of progressive SAC feature 17 for destination station 12. This function is shown in FIG. 3.

If switch-hook activity at station 12 is not detected at step 222, processor 16 checks whether the timeout interval that had been set at step 216 has expired, at step 226. If the timeout interval has not expired, processor 16 returns to step 222. If the timeout interval has expired, processor 16 proceeds to step 212 to redirect the call to call-coverage facility 13.

It will be noted that, if the call has been redirected to facility 13, the duration of the timeout interval will be shorter for the next call destined for station 12, as a consequence of step 218. This interval will be progressively shorter for each succeeding call to station 12 until the duration of the interval reaches zero, at which time the graduated SAC feature will assume the appearance of the conventional SAC feature, including turning on the SAC indicator lamp at destination station 12.

As was mentioned above, FIG. 3 shows the automatic reset function of progressive SAC feature 17. Execution of this function is invoked automatically at step 300 upon detection of switch-hook activity at a station 11-12. Assume that switch-hook activity, such as answering of an incoming call or generation of an outgoing call, has been detected at station 12. In response, processor 16 checks entry 251 of station 12 in table 250 to determine if the progressive SAC feature is enabled for this station, at step 302. (This step duplicates step 202 of FIG. 2). If the feature is not enabled for station 12, as determined at step 304, processor 16 exits the function of FIG. 3 and continues with conventional processing, as indicated at step 308. If the feature is enabled for station 12, as determined at step 304, processor 16 accesses entry 261 of station 12 in table 260 and resets the timeout interval duration indicated therein to the administered initial, maximum, value, at step 306. This effectively deactivates any progressive SAC activation for station 12 that may have taken place up to this point. Processor 16 then proceeds to step 308 to continue with conventional processing.

Of course, various changes and modifications to the illustrative embodiment described above will be apparent to those skilled in the art. For example, the invention is not limited in its use to telephony systems, but may be implemented and used to advantage substantially in any telecommunications systems, or even in any client-server environment where client requests for a resource are redirected to a secondary server when a primary server does not meet the request. Also, the capability may be provided by a remote, adjunct, processor, as opposed to the control processor of a switching system. Furthermore, it may be used to advantage with a wide variety of call-forwarding or call-coverage features. Such changes and modifications can be made without departing from the spirit and the scope of the invention and without diminishing its attendant advantages. It is therefore intended that such changes and modifications be covered by the following claims.

We claim:

1. A method of controlling a call in a telecommunications arrangement, comprising the steps of:
   in response to each individual call of a sequence of a plurality of calls, automatically monotonically changing, relative to an amount of time corresponding to the individual call that is allowed to pass before detection of a first predetermined condition results in a first predetermined action being taken with respect to the individual call, an amount of time that is allowed to pass before detection of the first predetermined condition results in the first predetermined action being taken with respect to a corresponding next call in the sequence; and
   in response to detection of a second predetermined condition, automatically setting to a predetermined amount of time an amount of time that is allowed to pass before detection of the first predetermined condition results in a first predetermined action being taken with respect to a corresponding next call.

2. The method of claim 1 wherein
   the step of automatically monotonically changing comprises the step of automatically reducing the amount of time corresponding to the next call in the sequence.

3. The method of claim 2 wherein
   the amount of time corresponding to a last call in the sequence is reduced to zero whereby the first predetermined action is taken with respect to the last call immediately in response to the last call, and remains at zero for each subsequent call until detection of the second predetermined condition.

4. The method of claim 1 wherein
   the amount of time is allowed to automatically monotonically change only within a predetermined range, and the predetermined amount of time is a limit of the range that the amount of time is monotonically changing away from.

5. The method of claim 1 wherein
   the predetermined condition comprises a failure of a destination facility to which the call is directed to answer the call, and
   the first predetermined action comprises a redirection of the call to an alternative facility.

6. The method of claim 5 wherein
   the second predetermined condition comprises at least one of (a) answering and (b) originating, a call at the destination facility.

7. The method of claim 5 wherein
   the second predetermined condition comprises switch-hook activity at the destination facility.

8. A method of providing call coverage in a telecommunications arrangement, comprising the steps of:
   in response to a call directed to a destination facility going unanswered at the destination facility for a first period of time,
   automatically redirecting the call to an alternative facility, and
   automatically setting a second period of time shorter than the first period as a period of time for which a next call directed to the destination facility will be allowed to go unanswered at the destination facility before being automatically redirected to the alternative facility; and
   in response to detection of an event at the destination facility suggesting that a next call directed to the destination facility may be answered at the destination facility, automatically setting a maximum predetermined period of time as a period of time for which the next call directed to the destination facility will be allowed to go unanswered at the destination facility before being automatically redirected to the alternative facility.

9. The method of claim 8 wherein
   the steps of automatically redirecting and automatically setting a second period of time respectively comprise the steps of
   in response to each call of a sequence of a plurality of calls directed to the destination facility that goes unanswered at the destination facility,
   automatically redirecting the call to an alternative facility upon expiration of an amount of time corresponding to the call and for which the call goes unanswered at the destination facility, and
   automatically reducing, relative to the amount of time corresponding to the call, an amount of time corresponding to a next call in the sequence and for which the next call is allowed to go unanswered at the destination facility before being redirected to the alternative facility.

10. The method of claim 9 wherein
    the amount of time corresponding to a last call in the sequence is reduced to zero such that the last call is immediately redirected to the alternative facility, and remains at zero for each subsequent call until detection of the event.

11. The method of claim 8 wherein
    the event comprises switch-hook activity at the destination facility.

12. The method of claim 8 wherein
    the event comprises at least one of (a) a call being answered and (b) a call being originated at the destination facility.

13. The method of claim 9 wherein
    detection of the event one of (a) precedes and (b) follows the sequence of calls.

14. A method of providing call coverage in a telecommunications arrangement, comprising the steps of:
    in response to receipt of each call destined for a destination facility,
    (A) determining a specified period of time for which a call directed to the destination facility is allowed to go unanswered at the destination facility, (B) shortening the specified period of time, (C) in response to the determined period of time being of nonzero duration, directing the received call to the destination facility, and (D) in response either to the determined period of time being of zero duration or to the directed received call going unanswered at the destination facility for the nonzero determined period of time, redirecting the received call to a call coverage facility; and in response to detection of each predetermined event at the destination facility that suggests that a call directed to the destination facility will be answered at the destination facility, (E) lengthening the specified period of time to a predetermined maximum length.

15. A telecommunications call-control arrangement comprising:

means responsive to each individual call of a sequence of a plurality of calls, for automatically monotonically changing, relative to an amount of time corresponding to the individual call that is allowed to pass before detection of a first predetermined condition results in a first predetermined action being taken with respect to the individual call, an amount of time that is allowed to pass before detection of the first predetermined condition results in the first predetermined action being taken with respect to a corresponding next call in the sequence; and means responsive to detection of a second predetermined condition, for automatically setting to a predetermined amount of time an amount of time that is allowed to pass before detection of the first predetermined condition results in a first predetermined action being taken with respect to a corresponding next call.

16. The arrangement of claim 15 further comprising:

means for detecting the predetermined conditions; and means for taking the first predetermined action.

17. The arrangement of claim 15 wherein the means for automatically monotonically changing comprise means for automatically reducing the amount of time corresponding to the next call in the sequence.

18. The arrangement of claim 17 wherein the reducing means comprise means for reducing the amount of time corresponding to a last call in the sequence to zero, whereby the first predetermined action is taken with respect to the last call immediately in response to the last call; and means for maintaining an amount of time corresponding to each call subsequent to the last call in the sequence at zero until detection of the second predetermined condition.

19. The arrangement of claim 15 wherein the means for automatically monotonically changing automatically monotonically change the amount of time only within a predetermined range, and the predetermined amount of time is a limit of the range that the amount of time is monotonically changing away from.

20. The arrangement of claim 15 wherein the predetermined condition comprises a failure of a destination facility to which the call is directed to answer the call, and the first predetermined action comprises a redirection of the call to an alternative facility.

21. The arrangement of claim 20 wherein the second predetermined condition comprises at least one of (a) answering and (b) originating, a call at the destination facility.

22. The arrangement of claim 20 wherein the second predetermined condition comprises switch-hook activity at the destination facility.

23. An arrangement for providing telecommunications call coverage comprising:

means responsive to a call directed to a destination facility going unanswered at the destination facility for a first period of time, for automatically redirecting the call to an alternative facility;

means responsive to the call directed to the destination facility going unanswered at the destination facility for the first period of time, for automatically setting a second period of time shorter than the first period as a period of time for which a next call directed to the destination facility will be allowed to go unanswered at the destination facility before being automatically redirected to the alternative facility; and means responsive to detection of an event at the destination facility suggesting that a next call directed to the destination facility may be answered at the destination facility, for automatically setting a maximum predetermined period of time as a period of time for which the next call directed to the destination facility will be allowed to go unanswered at the destination facility before being automatically redirected to the alternative facility.

24. The arrangement of claim 23 wherein the means for automatically redirecting comprise means responsive to each call of a sequence of a plurality of calls directed to the destination facility that goes unanswered at the destination facility, for automatically redirecting the call to an alternative facility upon expiration of an amount of time corresponding to the call and for which the call goes unanswered at the destination facility; and the means for automatically setting a second period of time comprise means responsive to each call of the sequence of the plurality of calls directed to the destination facility that goes unanswered at the destination facility, for automatically reducing, relative to the amount of time corresponding to the call, an amount of time corresponding to a next call in the sequence and for which the next call is allowed to go unanswered at the destination facility before being redirected to the alternative facility.

25. The arrangement of claim 24 wherein the reducing means comprise means for reducing the amount of time corresponding to a last call in the sequence to zero, such that the last call is immediately redirected to the alternative facility; and means for maintaining an amount of time corresponding to each call subsequent to the last call in the sequence at zero until detection of the event.

26. The arrangement of claim 23 wherein the event comprises switch-hook activity at the destination facility.

27. The arrangement of claim 23 wherein the event comprises at least one of (a) a call being answered and (b) a call being originated at the destination facility.

28. The arrangement of claim 24 wherein detection of the event one of (a) precedes and (b) follows the sequence of calls.

29. A telecommunications arrangement for providing call coverage comprising:

means responsive to (A) receipt of each call destined for a destination facility, for determining a specified period of time for which a call directed to the destination facility is allowed to go unanswered at the destination facility;

means responsive to (A), for shortening the specified period of time;

means responsive to the determined period of time being of nonzero duration, for directing the received call to the destination facility;

means responsive either to the determined period of time being of zero duration or to the directed received call going unanswered at the destination facility for the nonzero determined period of time, for redirecting the received call to a call coverage facility; and means responsive to detection of each predetermined event at the destination facility that suggests that a call directed to the destination facility will be answered at the destination facility, for lengthening the specified period of time to a predetermined maximum length.

* * * * *